(12) United States Patent
Moore et al.

(10) Patent No.: US 6,401,344 B1
(45) Date of Patent: Jun. 11, 2002

(54) HEAD FOR LINE TRIMMING APPARATUS

(76) Inventors: Mark R. Moore, 400 Bagdad Rd., Westlake, LA (US) 70669; David Roland Graves, 228 Cannon Ridge Dr., Brandon, MS (US) 39042

( * ) Notice: Subject to any disclaimer, the term of this patent is extended or adjusted under 35 U.S.C. 154(b) by 0 days.

(21) Appl. No.: 09/645,140

(22) Filed: Aug. 24, 2000

Related U.S. Application Data (60) Provisional application No. 60/154,952, filed on Sep. 21, 1999.

(51) Int. Cl.[7] ............................................. A01D 34/416
(52) U.S. Cl. ......................... 30/347; 30/276; 56/12.7; 56/295
(58) Field of Search ...................... 30/276, 347; 56/294, 56/295, 12.7

(56) References Cited

U.S. PATENT DOCUMENTS

| | | |
|---|---|---|
| 2,608,043 A | 8/1952 | Berdan |
| 2,793,485 A | 5/1957 | Emmons |
| 2,867,960 A | 1/1959 | Stiles et al. |
| 2,938,323 A | 5/1960 | Livingston et al. |
| 2,942,397 A | 6/1960 | Clark |
| 3,014,333 A | 12/1961 | Clark, Jr. |
| 3,130,793 A | 4/1964 | Allegretti |
| 3,474,608 A | 10/1969 | Frick |
| 3,559,742 A | 2/1971 | Rogillio, Sr. |
| 3,587,749 A | 6/1971 | Sauer |
| 3,664,102 A | 5/1972 | Reber |
| 3,708,967 A | 1/1973 | Geist et al. |
| 3,759,020 A | 9/1973 | Simmons |
| 3,774,379 A | 11/1973 | Mizohata et al. |
| 3,826,068 A | 7/1974 | Ballas et al. |
| 3,831,278 A | 8/1974 | Voglesoner |
| 3,859,776 A | 1/1975 | Ballas et al. |
| 4,035,912 A | 7/1977 | Ballas et al. |
| 4,043,037 A | 8/1977 | Okamoto et al. |
| 4,047,299 A | 9/1977 | Bair |
| 4,054,992 A | 10/1977 | Ballas et al. |
| 4,062,114 A | 12/1977 | Luick |
| 4,062,115 A | 12/1977 | Lee |
| 4,065,913 A | 1/1978 | Fisher et al. |
| 4,089,114 A | 5/1978 | Doolittle et al. |
| 4,097,991 A | 7/1978 | Proulx |
| 4,104,797 A | 8/1978 | Ballas |
| 4,112,653 A | 9/1978 | Ballas et al. |
| 4,145,809 A | 3/1979 | Proulx |
| 4,182,100 A | 1/1980 | Letter |
| 4,190,954 A | 3/1980 | Walto |
| 4,199,926 A | 4/1980 | Petty |
| 4,200,978 A | 5/1980 | Irelan et al. |
| 4,203,212 A | 5/1980 | Proulx |
| 4,224,784 A | 9/1980 | Hansen et al. |

(List continued on next page.)

Primary Examiner—Hwei-Siu Payer
(74) Attorney, Agent, or Firm—George R. Schultz (57) ABSTRACT

A head for a line trimming apparatus includes a body member and a detachable cover which may include a replaceable insert for connecting the head to a drive shaft of a line trimming apparatus. The body member includes opposed openings and a filament receiving channel for inserting an elongated flexible cutting filament into the head for retention thereon. A spring biased clamp is supported on the body member and is engageable with the filament portion residing in the channel to releasably retain the filament connected to the head. An actuator button projects through an opening in the body member and is operable to be pressed to cause the clamp to release forcible engagement with a filament so that the filament may be removed and replaced. In one embodiment the clamp and actuator are an integrally formed part and the filament projects through openings formed in spaced apart arms of the clamp member. In another embodiment, the clamp and actuator members are separate parts which are mounted for sliding movement in the body member. Coil springs are operable to bias the clamp members of both embodiments into forcible engagement with the filament.

26 Claims, 5 Drawing Sheets

U.S. PATENT DOCUMENTS

| | | |
|---|---|---|
| 4,229,882 A | 10/1980 | Chartier |
| 4,236,312 A | 12/1980 | Foster et al. |
| 4,244,103 A | 1/1981 | Snarr |
| 4,259,782 A | 4/1981 | Pronlx |
| 4,268,964 A | 5/1981 | Moore |
| 4,271,594 A | 6/1981 | Kilmer |
| 4,271,595 A | 6/1981 | Rahe |
| 4,285,128 A | 8/1981 | Schnell et al. |
| 4,287,709 A | 9/1981 | Lowry et al. |
| 4,290,200 A | 9/1981 | Lombard |
| 4,295,324 A | 10/1981 | Frantello et al. |
| 4,301,642 A | 11/1981 | Thurber |
| 4,312,178 A | 1/1982 | Callahan |
| 4,335,510 A | 6/1982 | Close et al. |
| 4,341,060 A | 7/1982 | Lowry et al. |
| 4,343,139 A | 8/1982 | Lowry et al. |
| 4,362,007 A | 12/1982 | Kennedy et al. |
| 4,389,836 A | 6/1983 | Lowry et al. |
| 4,411,069 A | 10/1983 | Close et al. |
| 4,411,126 A | 10/1983 | Lowry et al. |
| 4,412,382 A | 11/1983 | White, III |
| 4,428,183 A | 1/1984 | Lowry et al. |
| 4,442,659 A | 4/1984 | Enbusk |
| 4,446,680 A | 5/1984 | D'Alessandro |
| 4,463,544 A | 8/1984 | Carsello et al. |
| 4,512,143 A | 4/1985 | Jimenez |
| 4,531,350 A | 7/1985 | Huthmacher |
| 4,566,189 A | 1/1986 | Muto |
| 4,571,831 A | 2/1986 | White, III |
| 4,586,257 A | 5/1986 | Rittenhouse |
| 4,587,800 A | 5/1986 | Jimenez |
| 4,599,796 A | 7/1986 | Baba |
| D285,079 S | 8/1986 | Huthmacher |
| 4,633,658 A | 1/1987 | Nogawa |
| 4,641,431 A | 2/1987 | Leming et al. |
| 4,644,655 A | 2/1987 | Bottamiller et al. |
| 4,651,421 A | 3/1987 | Zerrer |
| 4,685,279 A | 8/1987 | Gullett |
| 4,688,376 A | 8/1987 | Wolfe, Sr. |
| 4,704,849 A | 11/1987 | Gilbert et al. |
| 4,712,363 A | 12/1987 | Calborn |
| 4,724,632 A | 2/1988 | Bilsland et al. |
| 4,726,176 A | 2/1988 | McGrew |
| 4,736,573 A | 4/1988 | Seck |
| 4,756,146 A | 7/1988 | Rouse |
| 4,756,147 A | 7/1988 | Savell |
| 4,756,148 A | 7/1988 | Gander |
| 4,796,415 A | 1/1989 | Moore |
| 4,805,306 A | 2/1989 | Baba |
| 4,819,333 A | 4/1989 | Baba |
| 4,823,542 A | 4/1989 | Klever et al. |
| 4,829,755 A | 5/1989 | Nance |
| 4,852,258 A | 8/1989 | Foster |
| 4,856,194 A | 8/1989 | Lee |
| D304,728 S | 11/1989 | Piorkowski |
| 4,879,869 A | 11/1989 | Buckendorf, Jr. |
| 4,891,931 A | 1/1990 | Holland |
| 4,905,465 A | 3/1990 | Jones et al. |
| 4,914,899 A | 4/1990 | Carmine |
| 4,922,694 A | 5/1990 | Emoto |
| 4,926,557 A | 5/1990 | Haupt |
| 4,936,886 A | 6/1990 | Quillen |
| 4,945,717 A | 8/1990 | Schaffer |
| 4,981,012 A | 1/1991 | Claborn |
| 4,987,681 A | 1/1991 | Sepke |
| 4,989,321 A | 2/1991 | Hoffmann |
| 5,010,649 A | 4/1991 | Hoffmann |
| 5,020,224 A | 6/1991 | Haupt |
| 5,023,998 A | 6/1991 | Masciarella et al. |
| 5,029,435 A | 7/1991 | Buchanan |
| 5,048,278 A | 9/1991 | Jones et al. |
| 5,060,383 A | 10/1991 | Ragkiewich |
| 5,092,112 A | 3/1992 | Buckendorf, Jr. |
| 5,197,264 A | 3/1993 | Lacey |
| 5,263,303 A | 11/1993 | Stroud |
| 5,276,969 A | 1/1994 | Luick |
| 5,279,102 A | 1/1994 | Foster |
| 5,287,683 A | 2/1994 | Smith |
| 5,303,476 A | 4/1994 | Tuggle |
| 5,345,683 A | 9/1994 | Kanou |
| 5,398,416 A | 3/1995 | Mackey |
| 5,404,644 A | 4/1995 | Needham et al. |
| 5,406,708 A | 4/1995 | Stephens et al. |
| 5,430,943 A | 7/1995 | Lee |
| 5,433,006 A | 7/1995 | Taguchi |
| 5,490,641 A | 2/1996 | Worthing |
| 5,493,783 A | 2/1996 | Oostendorp |
| 5,493,785 A | 2/1996 | Lawrence |
| 5,522,140 A | 6/1996 | Sugihara et al. |
| 5,522,141 A | 6/1996 | Sugihara et al. |
| 5,526,572 A | 6/1996 | Sugihara et al. |
| 5,577,374 A | 11/1996 | Huston |
| 5,603,205 A | 2/1997 | Foster |
| 5,613,354 A | 3/1997 | Foster |
| 5,615,543 A | 4/1997 | Caffey et al. |
| 5,644,844 A | 7/1997 | Pink |
| 5,651,418 A | 7/1997 | Jerez |
| 5,657,542 A | 8/1997 | White, III et al. |
| 5,671,536 A | 9/1997 | Everts et al. |
| 5,675,897 A | 10/1997 | Berfield |
| 5,722,172 A | 3/1998 | Walden |
| 5,743,019 A | 4/1998 | Berfield |
| 5,749,148 A | 5/1998 | White, III et al. |
| 5,758,424 A | 6/1998 | Iacona et al. |
| 5,761,892 A | 6/1998 | Quiroga |
| 5,765,287 A | 6/1998 | Griffini et al. |
| 5,771,670 A | 6/1998 | Perry |
| 5,806,192 A | 9/1998 | Everts et al. |
| 5,836,227 A | 11/1998 | Dees, Jr. et al. |
| 5,852,876 A | 12/1998 | Wang |
| 5,862,598 A | 1/1999 | Lee |
| 5,867,911 A | 2/1999 | Yates et al. |
| 5,881,464 A | 3/1999 | Collins |
| 5,881,465 A | 3/1999 | Brandt et al. |
| 5,887,348 A | 3/1999 | Iacona et al. |
| 5,890,352 A | 4/1999 | Molina |
| 5,896,666 A | 4/1999 | Iacona et al. |
| 5,901,448 A | 5/1999 | Lingerfelt |
| 5,979,064 A | 11/1999 | Kitz et al. |
| 5,987,756 A | 11/1999 | Yates et al. |
| 5,996,233 A | 12/1999 | Morabit et al. |

HEAD FOR LINE TRIMMING APPARATUS

CROSS REFERENCE TO RELATED APPLICATION

This application claims priority to provisional application No. 60/154,952 filed Sep. 21, 1999.

FIELD OF THE INVENTION

The present invention relates to flexible line trimming apparatus and, particularly, to a head for a flexible line trimming apparatus in which a flexible trimming filament or line segment may be inserted in the head and retained by a releasable clamping mechanism.

BACKGROUND

Rotary line trimmers are widely used for cutting or trimming grass, weeds and other vegetation in the upkeep of lawns. Line trimming apparatuses are typically characterized by a flexible, nylon trimming filament or "line" which is attached to a rotatable head of the apparatus. The line head is attached to a motor shaft which is rotated at high speeds, typically by trigger operation of a small gasoline engine or electric motor. When the line head is rotated, the rotating trimming filament serves as a cutting blade to cut grass, weeds or other vegetation.

After prolonged use of the apparatus, the cutting filament becomes worn and breaks, eventually requiring replacement. Accordingly, some line trimming apparatuses utilize a spool of the trimming filament or line which is incorporated in the whirling line head. The trimming filament is wound on the spool such that the filament can be dispensed from the spool as the rotating head is struck lightly against the ground. In other line trimming apparatuses, one or more short segments of trimming filament are attached to the line head for achieving the trimming function, and the trimming filaments are replaced by attaching replacement lengths of the trimming filament to the head. In both types of line trimming apparatus, the trimming filament typically extends from the line head through only one opening, and the edges of the opening engage the filament as the line head is rotated. After brief use of the apparatus, the edges tend to score the filament, causing premature breakage of the filament and requiring frequent and often difficult replacement of the filament in the head.

Line trimming apparatuses having heads of various design and including features for facilitating replacement of worn or broken trimming filaments, are well-known in the art. Patents of interest include U.S. Pat. Nos. 4,571,831; 5,303, 476; 5,345,683; 5,758,424; 5,836,227; 5,887,348; and 5,896,666.

SUMMARY OF THE INVENTION

The present invention provides an improved head for a flexible line trimming apparatus.

A head for a line trimming apparatus according to this invention is characterized by a body including a filament channel which extends through the head and receives a trimming filament of selected length. The single, substantially linear trimming filament is releasably clamped in the filament channel and extends from opposite sides of the head to thereby double the cutting or trimming efficiency of the apparatus. The opposed ends of the filament channel are each characterized by generously curved filament contact and support walls which engage the filament during rotation of the head, to prevent excessively acute or sharp bending of the filament and thus, such construction of the head significantly enhances filament longevity.

The present invention also provides a head for a line trimming apparatus characterized by a body and a cover which are typically secured to a motor shaft of the apparatus and enclose a sliding filament clamp which receives a trimming filament of selected length and thickness.

In one embodiment the filament clamp is characterized by a pair of clamp arms which extend from a clamp base through a pair of adjacent walls of the body and define a filament channel therebetween which substantially bisects the body, and the trimming filament extends through the clamp arms in the filament channel and from the filament channel at opposite sides of the body. The filament clamp is normally biased in a clamping position in which the clamp arms press the trimming filament against one of the channel defining walls of the body, and the extending end portions of the clamped filament are capable of cutting or trimming weeds, grass or other vegetation as the head is rotated.

In another embodiment of a head in accordance with the invention, the filament clamp comprises spaced apart clamp arms which are engageable with a filament to forcibly urge the filament against one of the walls forming a filament receiving channel in the body. A separate actuator member having a digitally actuatable button formed thereon is engageable with the clamp to move the clamp away from forcible engagement with the filament to allow removal and replacement thereof. In both embodiments, the filament clamp can be moved to a release position in which it releases the trimming filament from forcible engagement with the body wall to facilitate removal and replacement of the trimming filament in the head, as needed.

In both embodiments of the invention, a spring biases a filament clamp in a clamping position in which the clamp arms press the trimming filament against one of the clamp walls of the body, such that the trimming filament is secured in the filament channel and the extending end portions of the filament are capable of cutting or trimming weeds, grass or other vegetation as the head is rotated. In addition to the bias exerted by the clamp spring, the weight of the filament clamp imparts centrifugal forces thereto which stabilizes it in the clamping position as the line head is rotated.

An object of this invention is to provide a head for a line trimming apparatus which utilizes a trimming filament segment which can be easily removed and replaced on the head, as needed.

Another object of this invention is to provide a head for a line trimming apparatus characterized by a body member and a cover which are attachable as an assembly to a motor shaft of the apparatus, and a filament clamp is disposed on the body for receiving and forcibly engaging a trimming filament of selected length and thickness.

Another object of this invention is to provide a head for a line trimming apparatus characterized by a filament channel which extends through the head and receives a trimming filament releasably clamped in a filament channel and extends from opposite sides of the head to double the cutting or trimming efficiency of the apparatus, and the ends of which filament channel are each defined by a generously curved contact or support wall which engages the filament during rotation of the head, to prevent excessive bending and premature scoring and wearing of the filament so as to significantly enhance filament longevity.

Those skilled in the art will further appreciate the above-mentioned features and advantages of the invention together with other important aspects thereof upon reading the detailed description which follows in conjunction with the drawings.

BRIEF DESCRIPTION OF THE DRAWINGS

The invention will be better understood by reference to the accompanying drawings, wherein.

DETAILED DESCRIPTION OF PREFERRED EMBODIMENTS

Figures 1, 2, 3, 4, 5, 6, 7:
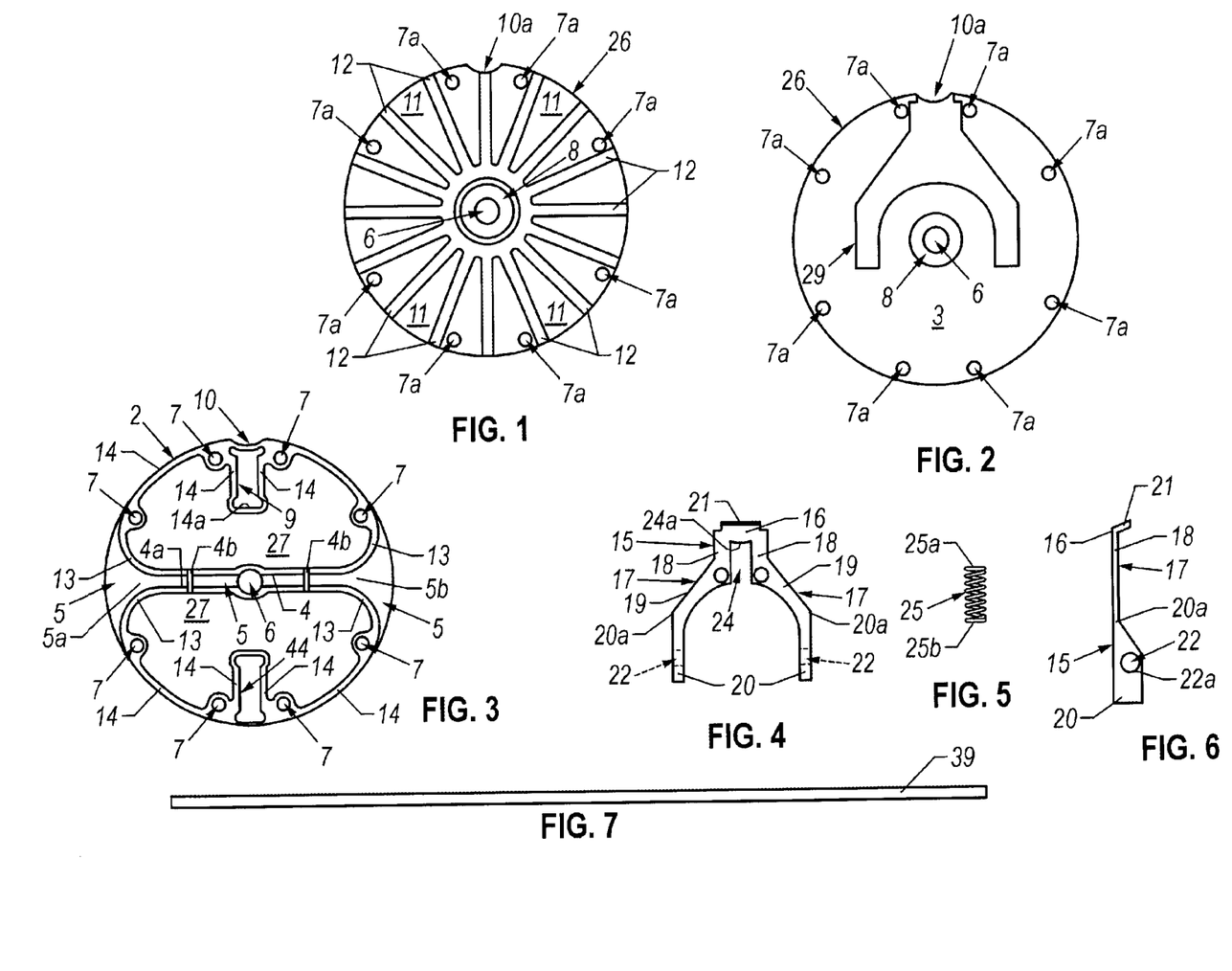
FIG. 1 is a top view of the cover component of one preferred embodiment of a head for a line trimming apparatus of this invention.
FIG. 2 is a bottom view of the cover illustrated in FIG. 1.
FIG. 3 is a top view of the body member of the head for a line trimming apparatus.
FIG. 4 is a top view of a filament clamp member of one preferred embodiment of the head for a line trimming apparatus.
FIG. 5 is a top view of the clamp spring member of the head of FIGS. 1 through 4.
FIG. 6 is a side view of the filament clamp member illustrated in FIG. 4.
FIG. 7 is a longitudinal view of a typical trimming filament for use with a head for a line trimming apparatus in accordance with this invention.
Figure 8:
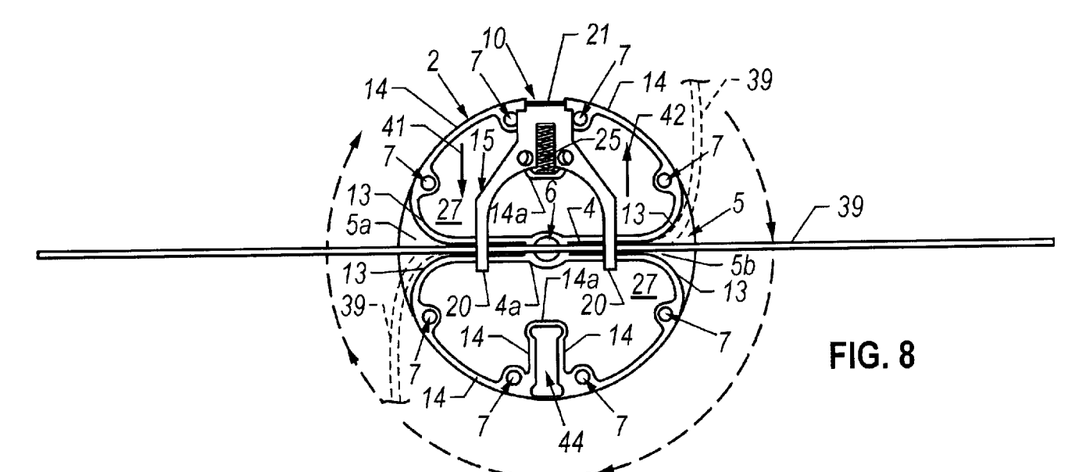
FIG. 8 is a top view of the body member, with the filament clamp fitted thereon and a trimming filament extending through the body member and the filament clamp.
Figure 9:
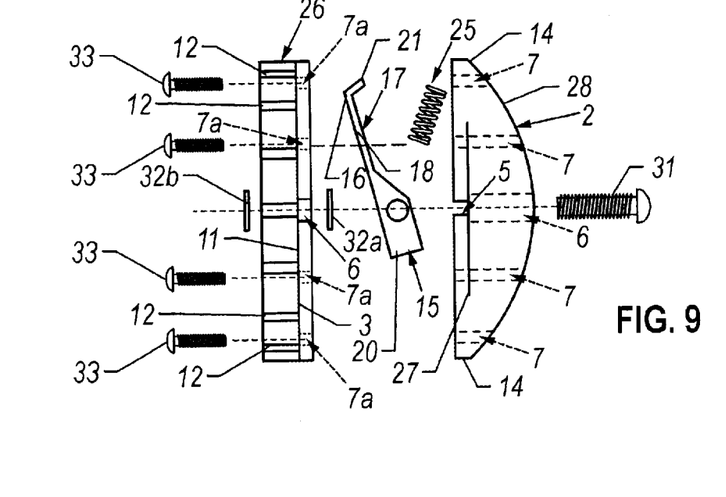
FIG. 9 is an exploded view of the head embodiment of FIGS. 1 through 8.
Figure 10:
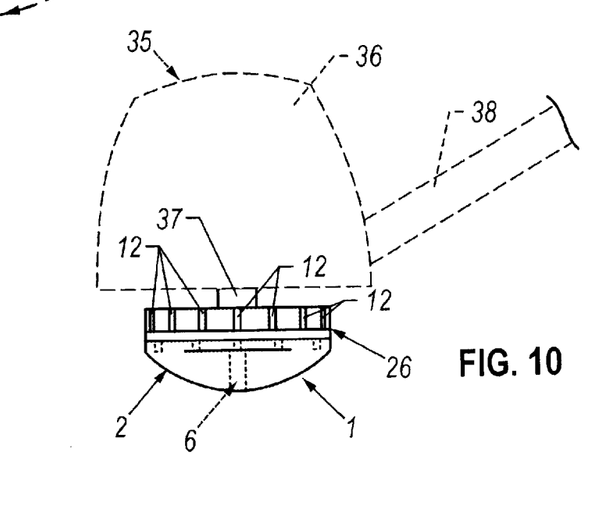
FIG. 10 is a side view of a conventional line trimming apparatus (illustrated in phantom), with the head of FIGS. 1 through 9 shown assembled and attached to the motor shaft of the apparatus.

Referring initially to FIGS. 1 through 3, 9 and 10 of the drawings, in one preferred embodiment a head for a line trimming apparatus is generally illustrated and designated by reference numeral 1 in FIGS. 9 and 10. As illustrated in FIG. 10, the head 1 is designed to be mounted for rotation with the motor shaft 37 of a conventional line trimming apparatus 35 (illustrated in phantom), typically characterized by a motor housing 36 which is provided on a handle 38 and houses an electric or gasoline-powered drive motor (not illustrated) for rotating a motor shaft 37, typically by actuation of a finger-operated trigger (not illustrated) provided on the handle 38. In operation of the head 1 as hereinafter further described, a flexible, linear, typically nylon, trimming filament 39, FIG. 7, of selected length and thickness extends through the head 1 as illustrated in FIG. 8, and is clamped therein to facilitate cutting or trimming grass, weeds or other vegetation by means of the opposed extending end portions of the rotating trimming filament 39. The head 1 includes a generally circular body member 2, typically constructed of molded plastic, metal or fiberglass and having an interior bottom surface 27, as illustrated in FIG. 3, and an exterior surface (not illustrated). A central shaft bolt opening 6 extends through the body 2 for receiving a shaft bolt 31, as illustrated in FIG. 9. The shaft bolt 31 secures the assembled head 1 on the motor shaft 37 of the line trimming apparatus 35, as illustrated in FIG. 10 and hereinafter further described.

As illustrated in FIG. 3, a first clamp wall 4 and a second clamp wall 4a extend from the interior body surface 27 of body 2 in adjacent, spaced-apart relationship with respect to each other. A filament channel 5, delimited by diametrally opposed openings 5a and 5b, FIG. 3, is, formed between the parallel first clamp wall 4 and second clamp wall 4a, and bisects the body 2 into substantially equal halves. Spaced apart clamp arm slots 4b, the purpose of which will be hereinafter described, extend transversely through the first clamp wall 4, filament channel 5 and second clamp wall 4a, respectively, on each side of the shaft bolt opening 6. The opposed end portions of the first clamp wall 4 and second clamp wall 4a are each curved generously to define a curved filament contact and support surface 13, each of which is continuous with a rim 14 which projects from the interior surface 27 along the edge or periphery of the body 2.

As further illustrated in FIG. 3, each rim 14 invaginates inwardly toward the central shaft bolt opening 6 to define at one pole of the body 2, an elongated spring cavity 9 having a wall 14a, and at the opposite pole of the body 2, a counterweight cavity 44. The spring cavity 9 receives a coil clamp spring 25 (FIG. 5), and the counterweight cavity 44 receives, typically, a lead counterweight (not illustrated), the purpose of which clamp spring 25 and counterweight will be hereinafter described. A clamp opening 10 is provided in the clamp rim 14, adjacent to the spring cavity 9. Multiple mount bolt openings 7 extend through the clamp rim 14 and body 2, in spaced-apart relationship with respect to each other around the circumference thereof for purposes which will be hereinafter further described.

As illustrated in FIGS. 1, 9 and 10, a cover 26, typically constructed of plastic, metal or fiberglass and having an interior cover surface 3, as illustrated in FIG. 2, and an exterior cover surface 11, as illustrated in FIG. 1, is mounted on the body 2, in assembly of the head 1 as hereinafter described. In one preferred embodiment illustrated in FIG. 1, multiple, circumferentially spaced cooling air propelling vanes or blades 12 typically project from the exterior cover surface 11 of the clamp cover 26, and extend radially from the central shaft bolt opening 6, in spaced-apart relationship with respect to each other for causing cooling air to flow over or through the motor housing 36 by convection during operation of the conventional electric motor powered line trimming apparatus 35. In another embodiment (not illustrated), the cooling air vanes 12 are typically omitted from the cover 26 under circumstances in which the head 1 is to be used with a conventional gasoline-powered line trimming apparatus. Multiple mounting bolt openings 7a extend through the cover 26 in spaced-apart relationship with respect to each other around the circumference thereof, and match the respective mounting bolt openings 7 of the body 2. Washer seats 8 are recessed in the interior cover surface 3 (FIG. 2) and exterior cover surface 11 (FIG. 1), respectively, in concentric relationship to the shaft bolt opening 6, for receiving a first washer 32a and second washer 32b, respectively, in assembly of the head 1 as illustrated in FIG. 9 and hereinafter further described.

The cover 26 is mounted on the body 2 with the interior cover surface 3 facing the interior plate surface 27 of the body 2, by extending mounting bolts 33 through the respective bolt openings 7a of the cover 26 and registering in bolt openings 7 of the body 2, as illustrated in FIG. 9 and hereinafter further described. As illustrated in FIG. 2, a clamp depression 29 is formed in the interior cover surface 3 of the clamp cover 26, for purposes which will be hereinafter further described. As illustrated in FIGS. 1 and 2, an opening 10a is provided in the edge of the cover 26, adjacent to the clamp depression 29, and complements the clamp opening 10 (FIG. 3) of the body 2 in the assembled head 1.

Referring next to FIGS. 4 through 6, 8 and 9 of the drawings, a filament clamp 15, typically metal, is seated in the congruent clamp depression 29 (FIG. 2) of the cover 26, and is slidably disposed between the body 2 and cover 26 of the assembled head 1. As illustrated in FIG. 4, the filament clamp 15 is characterized by a clamp base 16 and includes a pair of coextensive clamp arms 17, each having a straight arm segment 18 which extends from the clamp base 16 in substantially parallel, spaced-apart relationship with respect to the straight arm segment 18 of the opposite clamp arm 17. A substantially rectangular spring slot 24 is defined between the parallel straight arm segments 18 of the filament clamp 15, and is bounded on one end by a slot wall 24a of the clamp base 16. An angled arm segment 19 extends at an angle from each straight arm segment 18 of the clamp arm 17, and a parallel arm segment 20 extends from each angled arm segment 19 at an arm bend 20a.

A clamp actuator member 21, comprising a button or trigger, is provided on the clamp base 16 and, typically having scalloped edges (not illustrated), rests against the rim 14 of the body 2 in the assembled head 1, and is exposed through the opening 10 of the rim 14 as illustrated in FIG. 8 and hereinafter further described. As illustrated in FIG. 6, a filament opening 22 is provided in each parallel arm segment 20 of the filament clamp 15, in substantially registering or coaxial relationship with respect to the filament opening 22 of the opposite parallel arm segment 20. Each filament opening 22 is delimited by a clamp edge 22a of the corresponding parallel arm segment 20 of the filament clamp 15.

Referring next to FIGS. 7–10 and particularly to FIG. 8 of the drawings, in assembly of the head 1 the filament clamp 15 is positioned on the body 2, with the scalloped clamp button or trigger 21 of the clamp base 16 abutting against the rim 14 of the body 2 and exposed through the clamp opening 10 of the rim 14. The parallel arm segments 20 of the filament clamp 15 are fitted in the respective clamp arm slots 4b (each provided in the first clamp wall 4, filament channel 5 and second clamp wall 4a, respectively, of the body 2, FIG. 3). Accordingly, the spring slot 24 (FIG. 4) of the filament clamp 15 overlies the spring cavity 9 (FIG. 3) of the body 2. The clamp spring 25 is inserted through the spring slot 24 and seated in the underlying spring cavity 9, with the first end 25a of the clamp spring 25 engaging the convex slot wall 24a of the clamp base 16, and the second end 25b engaging the spring wall 14a of the spring cavity 9. The clamp spring 25 biases the clamp button 21 of the filament clamp 15 against the rim 14 of the body 2, with the filament openings 22 (FIG. 6, provided in the respective parallel arm segments 20 of the filament clamp 15), located partially in the first clamp wall 4 portion of the clamp arm slots 4b, and partially in the filament channel 5. A typically lead counterweight (not illustrated) is fitted in the counterweight cavity 44 (FIG. 8) of the body 2, for purposes which will be hereinafter described.

The shaft bolt 31 is extended through the shaft bolt opening 6 of the body 2, and the first washer 32a is inserted on the shaft bolt 31. The cover 26 is placed on the rim 14 of the body 2, with the filament clamp 15 fitted in the congruent clamp depression 29 (FIG. 2) on the interior cover surface 3 of the cover 26. The cover 26 is then secured to the body 2 as heretofore described, by threading the mounting bolts 33 (FIG. 9) through the bolt openings 7 of the body 2 and registering bolt openings 7a of the clamp cover 26. As the shaft bolt 31 is next extended through the shaft bolt opening 6 of the cover 26, the first washer 32a, provided on the shaft bolt 31, is seated in the washer seat 8 recessed in the interior cover surface 3 (FIG. 2) of the cover 26, as illustrated in FIG. 9. The filament clamp 15 is thus secured between the body 2 and cover 26.

By exerting finger pressure on the scalloped clamp button 21 through the opening 10 of the body 2 and cover 26, the filament clamp 15 can be slidably displaced in the clamp depression 29 of the cover 26, against the spring 25 in the radial inward direction toward the central axis of rotation of head 1, as indicated by the arrow 41 in FIG. 8, for purposes which will be hereinafter further described. As finger pressure is released from the clamp button 21, the spring 25 returns the filament clamp 15 to the original position, in the direction indicated by the arrow 42 in FIG. 8.

As illustrated in FIGS. 9 and 10, in typical operation the assembled head 1 is initially secured to the motor shaft 37 of the line trimming apparatus 35. This is accomplished by initially inserting a second washer 32b on the shaft bolt 31 (extending through the shaft bolt opening 6 of the clamp cover 26), seating the second washer 32b in the washer seat 8 (FIG. 1) recessed in the exterior cover surface 11 of the clamp cover 26, and threading and seating the shaft bolt 31 in a threaded bolt opening (not illustrated) provided in the motor shaft 37. As the clamp button 21 of the filament clamp 15 is pressed to reposition the filament clamp 15 against the spring 25 in the direction indicted by the arrow 41 in FIG. 8, the filament openings 22 (FIG. 6) in the parallel arm segments 20 of the filament clamp 15, normally located partially in the respective clamp arm slots 4b of the first clamp wall 4 and partially in the filament channel 5 of the body 2, become entirely located in the filament channel 5.

A flexible, typically nylon, trimming filament 39 (FIG. 7) of selected length is then extended through the filament channel 5 and filament openings 22, until, typically, substantially equal lengths of the trimming filament 39 extend from the filament channel 5 at respective sides of the body 2. The clamp button 21 of the clamp 15 is then released, causing the clamp spring 25 to reposition the filament clamp 15 in the direction indicated by the arrow 42, to the original position, thereby partially relocating the filament openings 22 from the filament channel 5 toward the respective clamp arm slots 4b (FIG. 3) of the first clamp wall 4, as the parallel arm segments 20 of the filament clamp 15 slide in the respective clamp arm slots 4b. This action causes the clamp edge 22a (FIG. 6) of each parallel arm segment 20 of the filament clamp 15 to press the trimming filament 39 against the first clamp wall 4, thus securing the trimming filament 39 in the filament channel 5.

Accordingly, the line trimming apparatus 35 is operated in conventional fashion typically by finger operation of a throttle actuator (not illustrated); to rotate the head 1 with the motor shaft 37 and facilitate the cutting or trimming of grass, weeds, foliage or other vegetation by means of the rotation trimming filament 39. In addition to bias exerted on the filament clamp 15 by the spring 25, the weight of the sliding filament clamp 15 imparts centrifugal tension to the filament clamp 15 which stabilizes it in the clamping position as the head 1 is rotated. The clamp counterweight (not illustrated) seated in the counterweight cavity 44 (FIG. 8) of the body 2, stabilizes the rotating head 1 by balancing the weight of the eccentric filament clamp 15 at the opposite pole of the body 2. It will be appreciated by those skilled in the art that when the head 1 is rotated in the clockwise direction indicted by the broken arrows in FIG. 8, a contact radius 13 of the first clamp wall 4 and second clamp wall 4a, respectively, engage the exiting portions (illustrated in phantom) of the trimming filament 39. This action facilitates rotation of the trimming filament 39 with the head 1, while preventing excessive bending and premature wearing, scoring or breaking of the trimming filament 39 after prolonged use by inducing a gradual, rather than a sharp, bend in the exiting portion of the trimming filament 39.

Replacement of the eventually broken or worn trimming filament 39 is accomplished, as needed, by initially pressing the clamp button 21 to displace the filament clamp 15 in the direction indicated by the arrow 41 in FIG. 8; removing the released trimming filament 39 from the parallel arm segments 20 of the filament clamp 15 and filament channel 5 of the clamp plate 2; inserting a replacement trimming filament 39 through the filament channel 5 and filament openings 22 of the parallel arm segments 20; and releasing the clamp button 21 of the clamp 15, to again cause displacement of the clamp 15 in the direction indicated by the arrow 42 in FIG. 8 and engagement of the replacement trimming filament 39 against the first clamp wall 4 by operation of the parallel arm segments 20.

Referring again to FIG. 8, in another embodiment a second filament clamp (not illustrated), having substantially the same design as the first filament clamp 15 heretofore described, may be provided on the body member 2, opposite the first filament clamp 15 for further stabilizing the trimming filament 39 in the filament channel 5. The parallel arm segments (corresponding to reference numeral 20 in FIG. 8) of the second filament clamp (not illustrated) are typically spaced a wider distance apart than the parallel arm segments 20 of the first filament clamp 15. The width of slots 4b could be increased to receive the arms of the second clamp. The second filament clamp is then biased in the opposite direction of the bias imparted by the clamp spring 25 on the first filament clamp 15 described above, by means of a second clamp spring (corresponding to spring 25 in FIG. 5), seated in the counterweight cavity 44 in the same manner that the clamp spring 25 is seated in the spring cavity 9, as heretofore described. The parallel arm segments of the second filament clamp could also be fitted in a second set of respective clamp arm slots (corresponding to reference numeral 4b in FIG. 3), typically located outside of and spaced from the respective clamp arm slots 4b described above with respect to FIG. 3.

The trimming filament 39 would extend through the filament openings 22 (FIG. 6) of both the first filament clamp 15 and corresponding openings in the second filament clamp, and the second filament clamp then normally would clamp the trimming filament 39 against the second wall 4a of the body 2, in the same manner that the first filament clamp 15 clamps the trimming filament 39 against the fist clamp wall 4 as heretofore described. A second opening 10 would be provided in the rim 14 adjacent to the counterweight cavity 44, and pressure could be simultaneously applied to both of the clamp actuator buttons (corresponding to numeral 21 in FIG. 8) of the respective first filament clamp 15 and second filament clamp, through respective openings 10 to release a trimming filament 39 from the first clamp wall 4 and second clamp wall 4a, respectively, and facilitate securing a replacement trimming filament 39 in the filament channel 5. It is understood that in this embodiment of the head 1, the first filament clamp 15 and second filament clamp balance each other in the rotating head 1 during operation of the line trimming apparatus 35, rendering the counterweight (not illustrated) seated in the counterweight cavity 44 as described above, unnecessary.

It will be appreciated by those skilled in the art that the head 1 enables quick and convenient replacement of trimming filaments, as needed, and contributes to longevity of the trimming filament 39 due to the unique curved design of the contact and support wall portions 13 of the first clamp wall 4 and second clamp wall 4a, respectively, as heretofore described. Extension of the trimming filament 39 from opposite sides of the head 1 substantially doubles the cutting efficiency of the trimming filament 39, as compared to most conventional line trimmers in which the trimming filament 39 typically extends from one opening in the line head. Furthermore, the head 1 is universal for attachment to virtually any type of existing conventional line trimming apparatus 35. It is understood that more than one trimming filament 39 of selected thickness can be clamped in the filament clamp 15, as desired, for cutting or trimming thick growth of grass, weeds or other vegetation.

Figure 11:
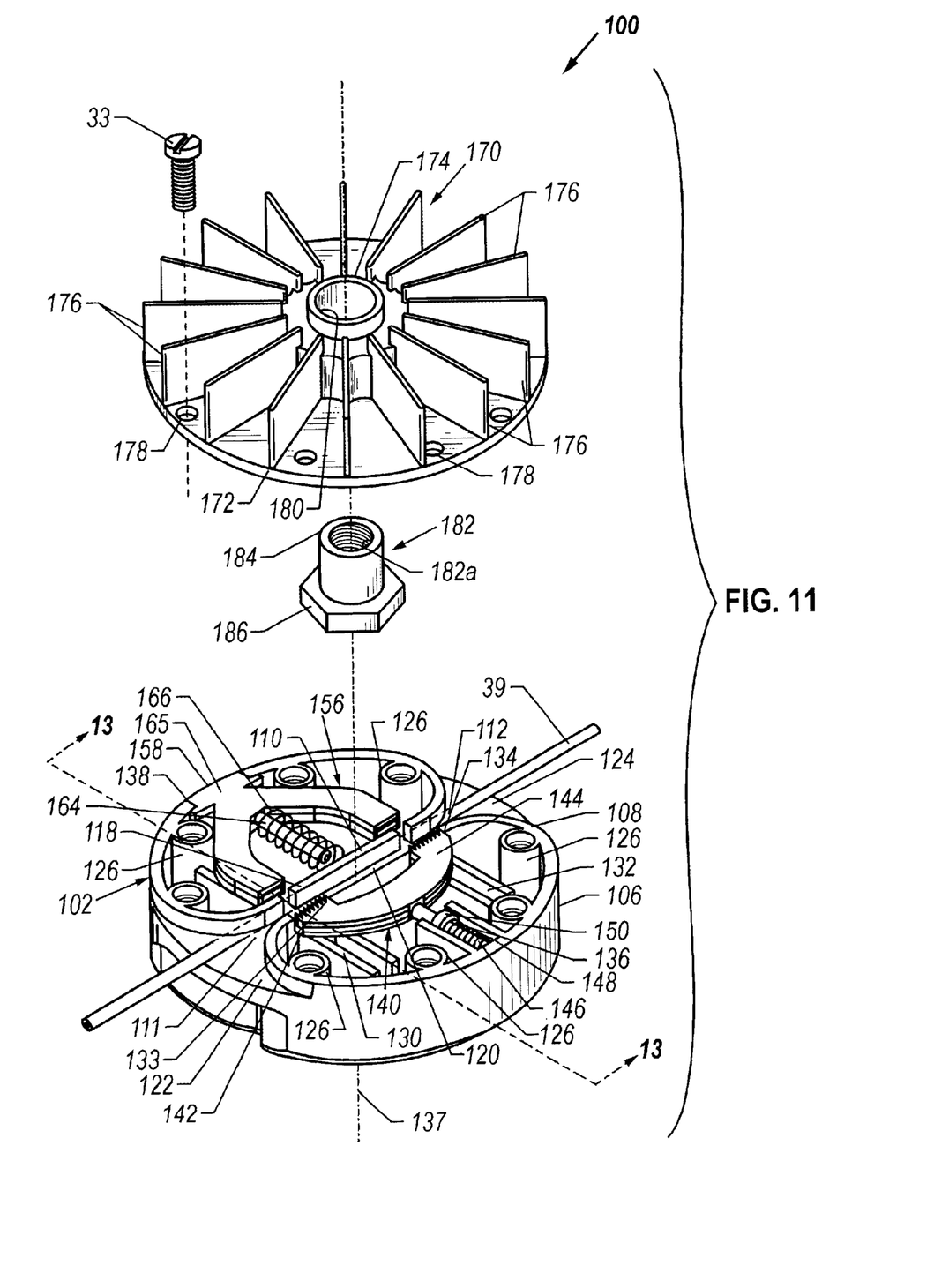
FIG. 11 is an exploded perspective view of an alternate embodiment of a head for a line trimming apparatus in accordance with the invention.
Figures 12, 17:
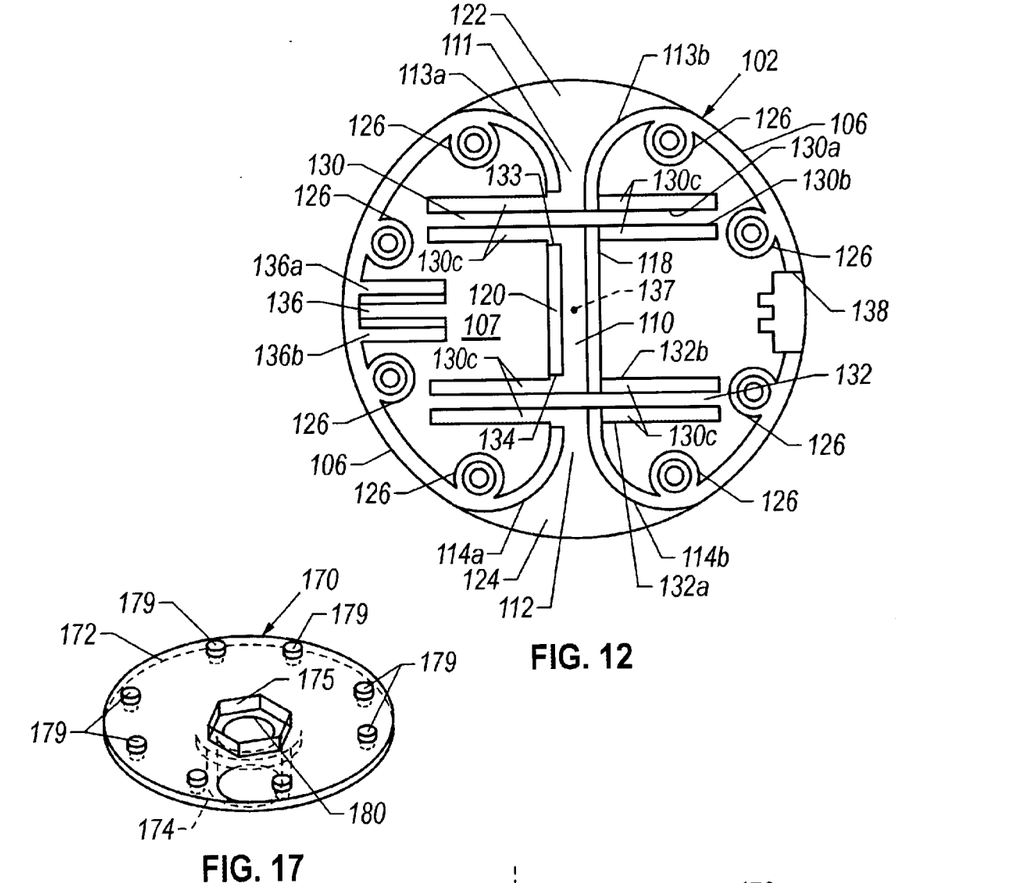
FIG. 12 is a top plan view of the body member for the head shown in FIG. 11.
FIG. 17 is a perspective view of the cover for the embodiment of FIGS. 11 through 15 in an inverted position.

Referring now to FIGS. 11 and 12, in particular, another preferred embodiment of a head in accordance with the invention is illustrated and generally designated by the numeral 100. The head 100 includes a generally cylindrical body member 102 having a somewhat hemispherical bottom wall 104, see FIG. 13, which is joined to a circular sidewall or rim 106 delimited by a transverse top surface 108. Rim 106 is also intersected at diametrically opposite sides thereof by a filament receiving channel 110 at diametrically opposed openings 111 and 112 to the channel. As shown in particular in FIG. 12, openings 111 and 112 are also defined by generously curved opposed sidewall entry portions 113a and 113b and 114a and 114b, respectively. The radii of the wall portions 113a, 113b, 114a and 114b are preferably about 0.50 inches to 0.65 inches for a channel 110 having a width of about 0.17 inches. Wall portions 113a, 113b, 114a and 114b merge with the circular rim 106, as shown, and are adapted to support a filament 39 in the same manner as wall portions 13 of head 1.

Hemispherical bottom wall 104 and rim 106 define a cavity 107, FIG. 12, in which upstanding spaced apart planar walls 118 and 120 are provided and extend between opposed planar shelf portions 122 and 124 which also extend between the respective radiused wall portions 113a, 113b and 114a, 114b to provide support for an elongated flexible filament member 39. Plural, circumferentially spaced and counterbored fastener receiving bosses 126 are integrally formed with rim 106, as shown in FIGS. 11 and 12. Shelves 122 and 124 are coplanar and extend toward each other at least partially within the channel 110.

As shown in FIG. 12, in particular, spaced apart elongated slots 130 and 132 extend substantially perpendicular to channel 110 and are defined, respectively, by closely spaced upstanding planar sidewalls 130a and 130b defining slot 130 and corresponding sidewalls 132a and 132b defining slot 132. Slots 130 and 132 also separate curved wall portions 114b and 113b from channel defining wall 118, and wall 120 from wall portions 113a and 114a, respectively. Channel defining sidewall 120 is of shorter overall length than wall 118 to define respective gaps 133 and 134. Referring further to FIG. 12, a spring retaining slot 136 extends generally parallel to the slots 130 and 132 and extends radially inwardly toward central axis 137 of head 100 and of body member 102, as defined by opposed sidewalls 136a and 136b. As also shown in FIG. 12, a clamp actuator button receiving opening 138 is formed in rim 106 opposite slot 136.

Figures 15, 16:
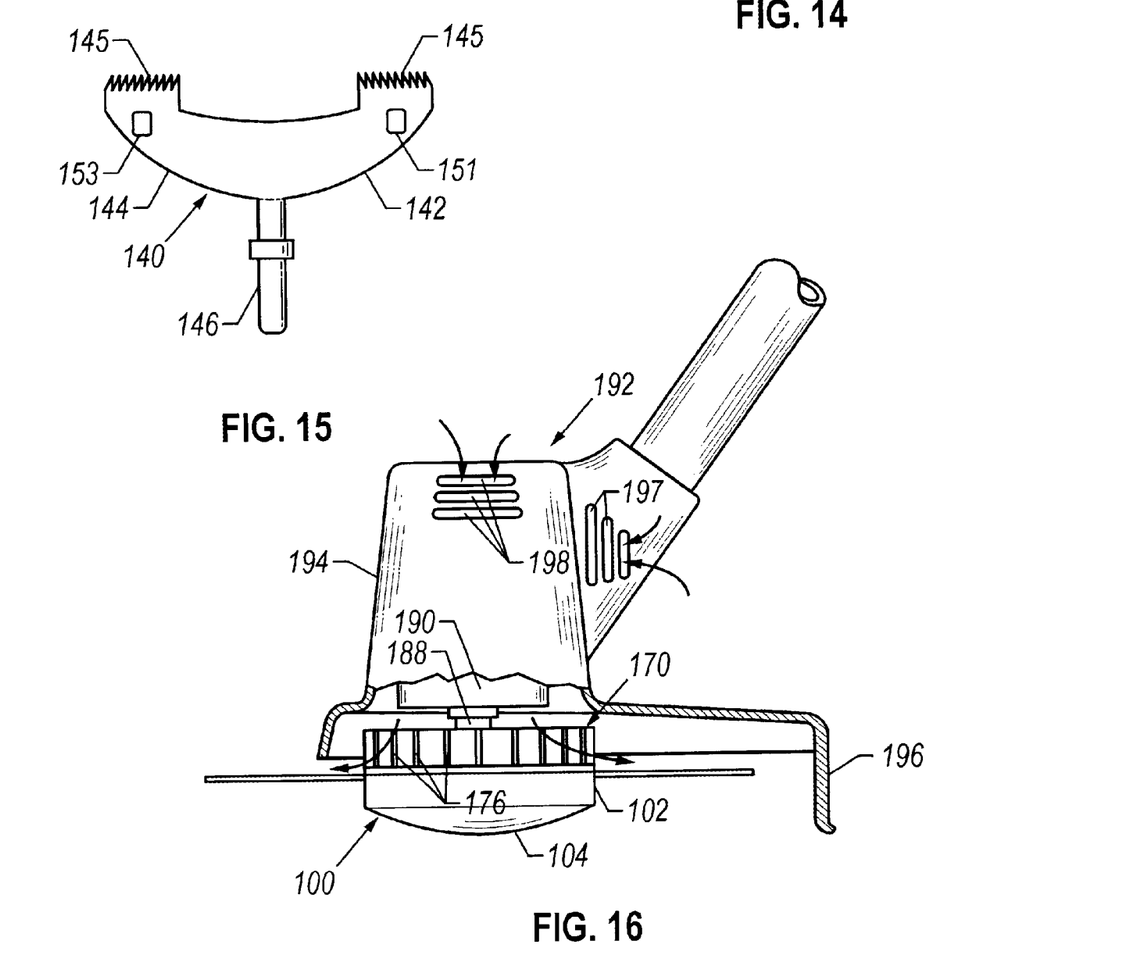
FIG. 15 is a bottom plan view of the filament clamp for the embodiment of the head of FIGS. 11 through 14.
FIG. 16 is a side elevation, partially sectioned, showing the head embodiment of FIGS. 11 through 15 connected to a drive motor of a line trimming apparatus.

Referring again to FIG. 11, the head 100 includes a filament clamp 140 including opposed clamp arms 142 and 144 which are dimensioned to fit slidably within gaps 133 and 134 as shown. Clamp 140 also includes an elongated generally cylindrical spring retainer guide pin 146 which is adapted to project into slot 136 and be journalled within a coil compression spring 148 also disposed in slot 136. An integral collar 150 of pin 146 engages one end of spring 148 to bias clamp 140 to move into the channel 110 and forcibly engage a filament 39. As shown in FIG. 15, clamp arms 142 and 144 are provided with serrations or teeth 145 adapted to be urged into gripping engagement with filament 39 by spring 148. Clamp 140 also includes depending guide and actuator tabs 151 and 153 formed thereon, see FIG. 15, and which are adapted to be disposed in the slots 130 and 132, respectively. Accordingly, clamp 140 is supported on coplanar bearing surfaces 130c, FIGS. 12 and 13, delimiting the top edges of walls 130a, 130b, 132a and 132b, is movable radially inwardly and outwardly with respect to the axis 137 and the rim 106 and is biased radially inwardly toward the axis by the coil spring 148.

Figure 13:
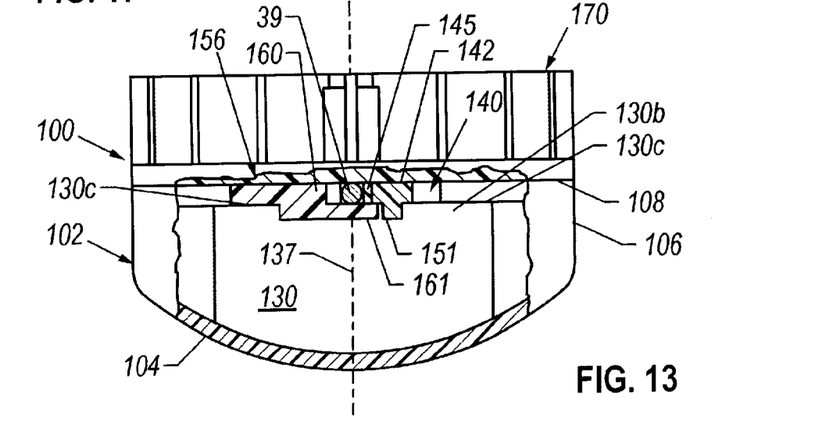
FIG. 13 is a section view taken along the line 13-13 of FIG. 11 with the cover and body assembled.
Figure 14:
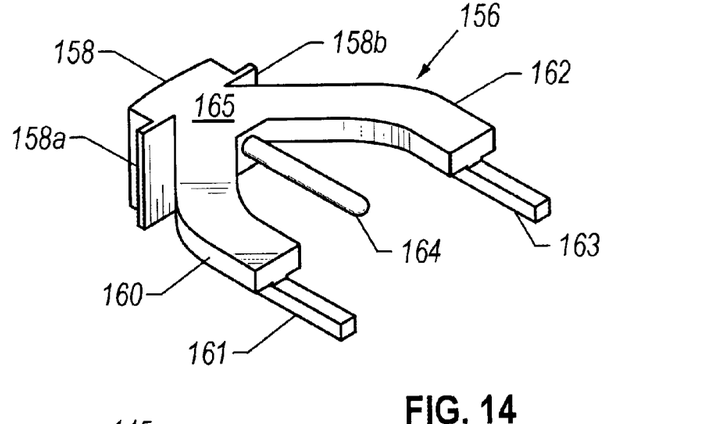
FIG. 14 is a perspective view of a clamp release actuator member for the embodiment of the head of FIGS. 11 through 13.

Referring further to FIG. 11, and also FIG. 14, clamp 140 is adapted to be actuated by an actuator member, generally designated by the numeral 156, which includes an integral button or trigger part 158 adapted to project through opening 138 in rim 106, see FIG. 11, and is integrally formed with opposed parallel extending arms 160 and 162. Button 158 includes opposed flanges 158a and 158b engageable with rim 106 adjacent the opening 138. Arms 160 and 162 have generally parallel guide and actuator projections 161 and 163, see FIG. 14, formed thereon and dimensioned to be slidably disposed in the slots 130 and 132, respectively, and also engageable with tabs 151 and 153, see FIG. 13 by way of example. The width of projections 161 and 163 is less than the width of the arms 160 and 162 so that the arms may be slidably disposed on top surface 130c delimiting the sets of slot defining walls 130a, 130b and 132a, 132b to slidably support the actuator member 156 for movement toward and away from clamp 140.

A spring retainer and support pin 164 extends generally parallel to and between arms 160 and 162 from an integral base portion 165 of actuator member 156, which base portion is also integrally formed with button 158. A coil spring 166, FIG. 11, is disposed over the pin 164 and extends between base portion 165 and wall 118 and is operable to bias the actuator member 156 radially outwardly away from axis 137 so that clamp 140 may have unrestricted ability to forcibly clamp filament 39 against the channel defining wall 118. However, in response to depressing button 158 radially inwardly of rim 106, the projections 161 and 163 engage tabs 151 and 153 to move the clamp 140 radially outwardly away from channel 110 to allow a filament 39 to be removed therefrom and replaced with a new filament. When button 158 is released, actuator member 156 is returned to the position shown in FIG. 11 so that clamp 140 may move into channel 110 to forcibly engage a new filament which has been inserted from either one of openings 111 or 112 into channel 110.

Referring further to FIGS. 11, 13 and 17, the head 100 also includes a generally circular disk-shaped cover 170 having a cylindrical disk-shaped cover part 172 and a central hub 174. Plural, circumferentially spaced, radially projecting cooling air blades 176 are integrally formed with the hub 174 and the disk part 172, as shown in FIG. 11. Circumferentially spaced fastener receiving bores 178 are adapted to receive fasteners 33, one shown, for securing cover 170 to body member 102 at support surface or face 108. Hub 174 includes a central cylindrical bore 180 for receiving an internally threaded insert 182 having a cylindrical boss portion 184 and a hex-shaped flange portion 186 which is adapted to fit nonrotatably in a correspondingly shaped counterbore portion 175 of boss 174, see FIG. 17. As also shown in FIG. 17, locating bosses 179 project from disk part 172 for registration with counterbored bosses 126 on body 102. Insert 182 is internally threaded at 182a, FIG. 11, for securing the head 100 to a correspondingly threaded drive shaft 188, see FIG. 16, of a motor 190 for a line trimming apparatus 192.

Accordingly, cover 170 is releasably securable to the body 102 by fasteners 33 to retain the working parts comprising the clamp 140, actuator member 156 and the respective biasing springs 148 and 166 in assembly with the body as described above. Referring briefly again to FIG. 16, line trimmer apparatus 192 includes a motor shroud 194 and a generally radially extending line guard 196. Motor shroud 194 may include suitable cooling airflow inlet ports 197 and 198 formed therein to allow motor cooling air to flow into the shroud and through the cooling air impeller blades 176 provided on the head 100.

Accordingly, head 100 may be easily connected to and disconnected from a line trimmer, such as the trimmer apparatus 192, by threadedly connecting the head to motor shaft 188. As previously described, cutting filament 39 may be easily replaced, without removing the head 100 from the line trimmer apparatus, by depressing actuator button 158 to release forcible engagement of the clamp 140 with the filament and then inserting a new filament through openings 111 or 112 and sliding the filament through the channel 110 until it is substantially centered with respect to the opposite ends of the filament and the central axis 137. Button 158 may then be released to allow clamp 140 to forcibly clamp and retain a new filament on the head 100 for cutting operations.

The parts of head 100 including the body 102, clamp 140, actuator member 156 and cover 170 may be formed of a suitable injection moldable polymer material such as reinforced nylon. The insert 182 may have selectively differing thread configurations of the threads 182 and is preferably formed of a suitable metal material such as aluminum or steel. Filament 39 may be of a suitable polymer material, such as nylon, and may have a diameter of up to about 0.080 inches for conventional line trimmer motor sizes adapted to operate at 4,000 to 6,000 rpm. Filament 39 may be of various lengths. A preferred length of Filament 39 is shown in FIG. 7. The preferred length is a distance proportional to the size of the drawing of FIG. 7 when compared to the size of the drawing of the body member 2 of FIG. 3. The ratio of the length of Filament 39, as shown in FIG. 7, to the diameter of the body member 2, as shown in FIG. 3 is used to calculate the actual preferred length of the Filament 39 when compared with the actual body member of the head for line trimming apparatus.

The construction and operation of the head 100 as well as the head 1 is believed to be readily understandable to those of ordinary skill in the art based on the foregoing description.

Although preferred embodiments of the invention have been described in detail herein, those skilled in the art will recognize and understand that various modifications and substitutions may be made to the heads 1 and 100 without departing from the scope and spirit of the appended claims.

What is claimed is:

1. A head for a line trimming apparatus, comprising:
   a body member adapted for attachment to a driving shaft of said line trimming apparatus, said body member including opposed openings therein for receiving an elongated filament member extending radially outward from an axis of rotation of said head from both of said openings;
   a clamp on said head moveable between a first position in which said clamp is engageable with said filament member for clamping said filament member to said head and a second position in which said clamp is operable to release said filament member from said head; and
   a biasing member engageable with said clamp for biasing said clamp in said first position.

2. The head set forth in claim 1 wherein:
   said body member includes a channel formed therein, said channel opening to opposed sides of said body member at said opposed openings, at least one wall defining said channel, and said clamp is operable to forcibly engage said filament member against said one wall to clamp said filament member in said channel.

3. The head set forth in claim 2 including:
   a cover member releasably engageable with said body member for covering said channel and for retaining said clamp supported in said body member.

4. The head set forth in claim 1 including:
   an actuator member operably connected to said clamp for moving said clamp from said first position to said second position.

5. The head set forth in claim 4 wherein:
   said actuator member includes a button portion projecting into an opening in said body member and operable to be engaged for moving said actuator member, at will, to cause said clamp to release forcible engagement with said filament member.

6. The head set forth in claim 5 wherein:
   said actuator member is integrally formed with said clamp.

7. The head set forth in claim 5 wherein:
   said actuator member is supported on said body member for movement between a clamp actuating position and a clamp release position and said actuator member is operable upon actuation of said button portion to move said clamp to release forcible engagement with said filament member.

8. The head set forth in claim 7 including:
   a resilient biasing member supported on said head for biasing said actuator member to a clamp release position.

9. The head set forth in claim 7 wherein:
   said actuator member includes opposed arm portions including elongated projections extending therefrom and slidably disposed in opposed, generally parallel slots, said slots extending generally normal to an elongated filament receiving channel formed in said body member.

10. The head set forth in claim 1 including:
   a cover releasably connected to said body member and including a hub portion, an insert adapted to be disposed in a bore in said hub portion and including a part thereof for attaching said head to a drive shaft of said line trimming apparatus.

11. The head set forth in claim 1 wherein:
   said biasing member comprises a spring operably engaged with said clamp, and said head includes an actuator member adapted to move said clamp against the bias of said spring from said first position to said second position.

12. The head set forth in claim 11 wherein:
   said clamp comprises opposed arm portions engageable with said filament retaining said filament member in a channel.

13. The head set forth in claim 12 wherein:
   said arm portions each include a filament receiving opening formed therein.

14. The head set forth in claim 12 wherein:
   said arm portions include serrations formed thereon for forcibly engaging said filament member.

15. The head set forth in claim 14 wherein:
   said clamp includes spaced apart tabs formed thereon and disposed in spaced apart slots formed in said body member for supporting said clamp for sliding movement between said first position and said second position.

16. The head set forth in claim 15 wherein:
   said actuator member includes opposed projections formed thereon and disposed in said slots in said body member and engageable with said tabs on said clamp for moving said clamp from said first position to said second position in response to actuation of said actuator member.

17. The head set forth in claim 1 wherein:
   said body member includes opposed curved sidewalls defining in part said opposed openings, said curved sidewalls being adapted to support said filament member when deflected during operation of said trimming apparatus.

18. The head set forth in claim 17 wherein:
   the radius of curvature of said curved sidewalls is in a range of about 0.50 inches to 0.65 inches.

19. The head set forth in claim 17 including:
   a shelf portion extending between said curved sidewalls, respectively, for supporting said filament member.

20. A head for a line trimming apparatus, comprising:
   a body member adapted for attachment to a driving shaft of said line trimming, apparatus, said body member including diametrally opposed openings therein for receiving an elongated flexible linear filament member extending radially outward from an axis of rotation of said head from both of said openings, said body member includes a channel formed therein, said channel opening to opposed sides of said body member at said opposed openings, and at least one wall defining said channel;
   a clamp on said head moveable between a first position in which said clamp is engageable with said filament member for clamping said filament member to said head and a second position in which said clamp is operable to release said filament member from said head, said clamp being operable to forcibly engage said filament member against said one wall to clamp said filament member in said channel;
   a biasing member engageable with said clamp for biasing said clamp in said first position; and
   a cover member releasably engageable with said body member.

21. The head set forth in claim 20 including:

an actuator member operably connected to said clamp for moving said clamp from said first position to said second position.

22. The head set forth in claim 21 wherein:

said actuator member includes a button portion operable to be engaged for moving said actuator member, at will, to cause said clamp to release forcible engagement with said filament member.

23. The head set forth in claim 22 wherein:

said actuator member is integrally formed with said clamp.

24. The head set forth in claim 21 wherein:

said actuator member is supported on said body member for movement between a clamp actuating position and a clamp release position and said actuator member is engageable with said clamp upon actuation of said button portion to move said clamp to release forcible engagement with said filament member.

25. The head set forth in claim 24 including:

a resilient biasing member supported on said head for biasing said actuator member to a clamp release position.

26. The head set forth in claim 24 wherein:

said actuator member includes opposed arm portions including elongated projections slidably disposed in opposed, generally parallel slots, said slots extending generally normal to said channel.

* * * * *